US010795458B2

(12) United States Patent
Wan

(10) Patent No.: US 10,795,458 B2
(45) Date of Patent: Oct. 6, 2020

(54) UNFUSED POSE-BASED DRIFT CORRECTION OF A FUSED POSE OF A TOTEM IN A USER INTERACTION SYSTEM

(71) Applicant: Magic Leap, Inc., Plantation, FL (US)

(72) Inventor: Sheng Wan, San Jose, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/523,779

(22) Filed: Jul. 26, 2019

(65) Prior Publication Data

US 2020/0042108 A1 Feb. 6, 2020

Related U.S. Application Data

(60) Provisional application No. 62/714,609, filed on Aug. 3, 2018, provisional application No. 62/818,032, filed on Mar. 13, 2019.

(51) Int. Cl.
| | |
|---|---|
| *G06F 3/0346* | (2013.01) |
| *G06F 3/03* | (2006.01) |
| *G06T 7/70* | (2017.01) |
| *G09G 5/38* | (2006.01) |
| *G06F 3/01* | (2006.01) |

(52) U.S. Cl.
CPC .......... *G06F 3/0346* (2013.01); *G06F 3/012* (2013.01); *G06F 3/0304* (2013.01); *G06T 7/70* (2017.01); *G09G 5/38* (2013.01); *G09G 2340/0464* (2013.01); *G09G 2354/00* (2013.01)

(58) Field of Classification Search
CPC ...... G06F 3/0346; G06F 3/012; G06F 3/0304; G09G 5/38; G09G 2304/0464; G09G 2354/00; G06T 7/70
See application file for complete search history.

(56) References Cited

U.S. PATENT DOCUMENTS

| | | | |
|---|---|---|---|
| 6,757,068 B2 | 6/2004 | Foxlin | |
| 2017/0205903 A1* | 7/2017 | Miller | G01R 33/02 |
| 2017/0357332 A1* | 12/2017 | Balan | G02B 27/0093 |

OTHER PUBLICATIONS

International Search Report and Written Opinion dated Oct. 22, 2019, International PCT Patent Application No. PCT/US19/43751, (9 pages).

* cited by examiner

*Primary Examiner* — Robert J Michaud
(74) *Attorney, Agent, or Firm* — Stephen M. De Klerk

(57) ABSTRACT

The invention relates generally to a user interaction system having a head unit for a user to wear and a totem that the user holds in their hand and determines the location of a virtual object that is seen by the user. A fusion routine generates a fused location of the totem in a world frame based on a combination of an EM wave and a totem IMU data. The fused pose may drift over time due to the sensor's model mismatch. An unfused pose determination modeler routinely establishes an unfused pose of the totem relative to the world frame. A drift is declared when a difference between the fused pose and the unfused pose is more than a predetermined maximum distance.

14 Claims, 8 Drawing Sheets

UNFUSED POSE-BASED DRIFT CORRECTION OF A FUSED POSE OF A TOTEM IN A USER INTERACTION SYSTEM

CROSS-REFERENCE TO RELATED APPLICATIONS

This application claims priority from U.S. Provisional Patent Application No. 62/714,609, filed on Aug. 3, 2018 and U.S. Provisional Patent Application No. 62/818,032, filed on Mar. 13, 2019, all of which are incorporated herein by reference in their entirety.

BACKGROUND OF THE INVENTION

1). Field of the Invention

This invention relates to a user interaction system having a totem that defines a six degree of freedom ("6dof") pose, or pose, of a virtual object that is perceived by a user.

2). Discussion of Related Art

Modern computing and display technology has facilitated the development of user interaction systems that include "augmented reality" viewing devices. Such a viewing device usually has a head unit with a head unit body that is mountable to a head of a user and frequently includes two waveguides, one in front of each eye of the user. The waveguides are transparent so that ambient light from real-world objects can transmit through the waveguides and the user can see the real-world objects. Each waveguide also serves to transmit projected light from a projector to a respective eye of the user. The projected light forms an image on the retina of the eye. The retina of the eye thus receives the ambient light and the projected light. The user simultaneously sees real-world objects and one or more virtual objects that are created by the projected light.

Such a user interaction system often includes a totem. The user may, for example, hold the totem in their right hand and move the totem with six degrees of freedom in three-dimensional space. A virtual object may be perceived by the user to be attached to the totem and move with the totem in three-dimensional space, or the virtual object may be the perception of a light beam that hits the wall or another object that the user moves across the wall.

It is important for the virtual object to remain in its realistic pose relative to the totem. For example, if the totem represents the handle of a racket and the virtual object represents a head of the racket, the head of the racket has to remain "attached" to the handle of the racket over time.

SUMMARY OF THE INVENTION

The invention provides a user interaction system including a totem having a totem body, an electromagnetic (EM) transmitter on the totem body and a totem inertial measurement unit (IMU) located on the totem, to generate a totem IMU signal due to movement of the totem; a head unit having a head unit body and an EM receiver on the head unit body to receive an EM wave transmitted by the EM transmitter, the EM wave being indicative of a location of the totem; a processor; a storage device connected to the processor and a set of instructions on the storage device and executable by the processor. The set of instructions includes a world frame, a fusion routine connected to the EM receiver and the totem IMU to generate a fused pose of the totem in the world frame based on a combination of the EM wave, the head unit pose, and the totem IMU data, an unfused pose determination modeler that determines a pose of the totem relative to the head unit and a pose of the head unit relative to the world frame to establish an unfused pose of the totem relative to the world frame, a comparator connected to the fused pose determination modeler and the unfused pose determination modeler to compare the fused pose with the unfused pose, a drift declarer connected to the comparator to declare a drift only if the fused pose is more than a predetermined distance from the unfused pose, a location correction routine connected to the drift declarer to reset a pose of the totem IMU to match the unfused location only if the drift is declared, a data source to carry image data and a display system connected to the data source to display a virtual object using the image data to a user, a location of the virtual object being based on the fused location of the totem.

The invention also provides a user interaction system including transmitting an electromagnetic (EM) wave with an EM transmitter on a totem body, generating a totem inertial measurement unit (IMU) signal with a totem IMU on the totem body due to movement of the totem, locating a head unit body on a head of a user, receiving the EM wave transmitted by the EM transmitter by an EM receiver on the head unit body, the EM wave being indicative of a pose of the totem, storing a world frame, executing, with a processor, a fusion routine to generate a fused pose of the totem in the world frame based on a combination of the EM wave, head unit pose, and the totem IMU data, executing, with the processor, an unfused pose determination modeler that determines a pose of the totem relative to the head unit and a location of the head unit relative to the world frame to establish an unfused pose of the totem relative to the world frame, executing, with the processor, a comparator to compare the fused pose with the unfused pose, executing, with the processor, a drift declarer to declare a drift only if the fused pose is more than a predetermined pose from the unfused pose, executing, with the processor, a pose correction routine to reset pose of the totem IMU to match the unfused pose only if the drift is declared, receiving image data from a data source; and displaying, with a display system connected to the data source, a virtual object using the image data to a user, a location of the virtual object being based on the fused location of the totem.

BRIEF DESCRIPTION OF THE DRAWINGS

The invention is further described by way of example with reference to the accompanying drawings, wherein.

DETAILED DESCRIPTION OF THE INVENTION

Figure 1:
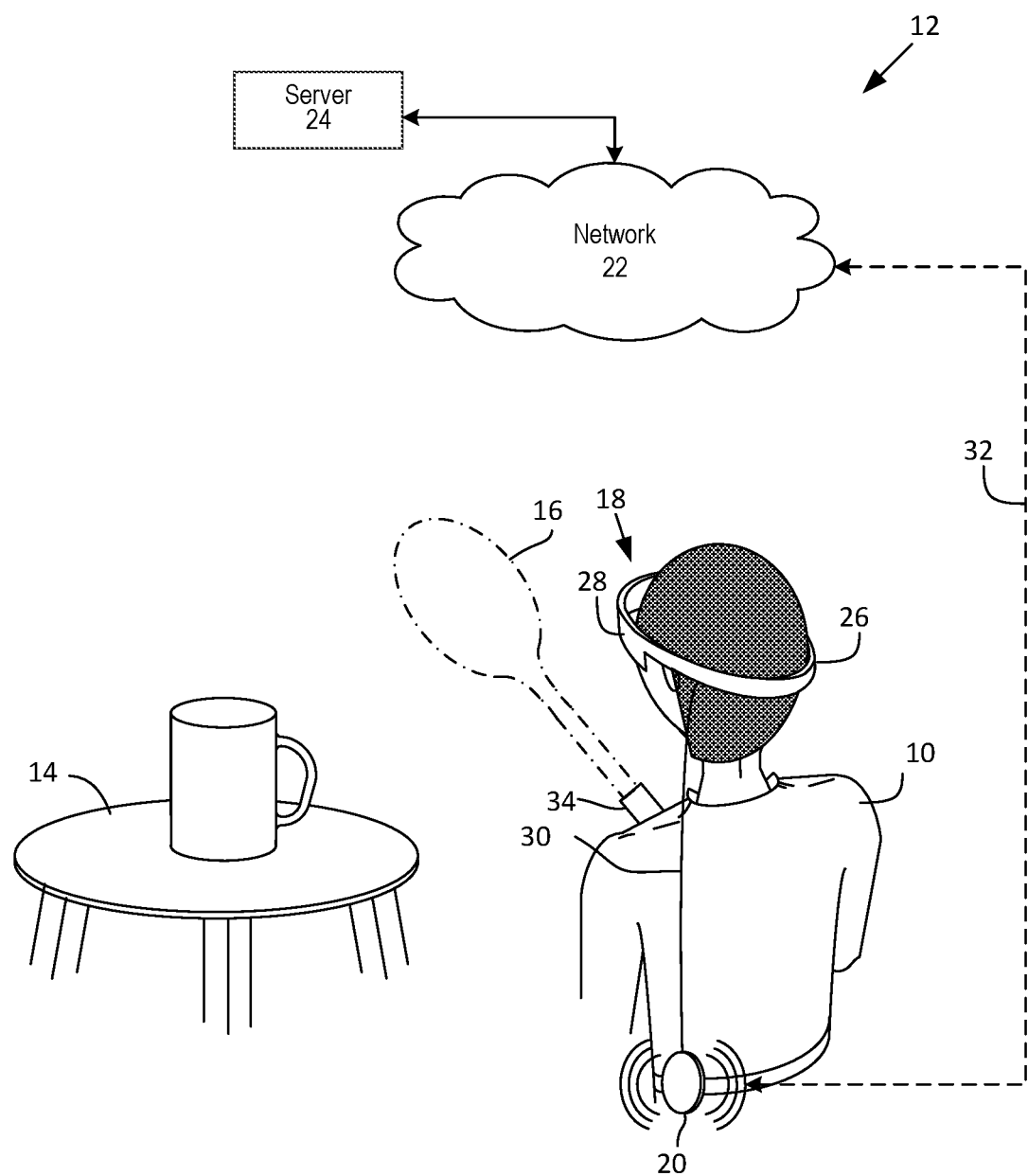
FIG. 1 is a perspective view illustrating a user interaction system, according to an embodiment of the invention.

FIG. 1 of the accompanying drawings illustrates a user 10, a user interaction system 12, according to an embodiment of the invention, a real-world object 14 in the form of a table, and a virtual object 16, which is not visible from the perspective of the figure but is visible to the user 10.

The user interaction system 12 includes a head unit 18, a belt pack 20, a network 22 and a server 24.

The head unit 18 includes a head unit body 26 and a display system 28. The head unit body 26 has a shape that fits over a head of the user 10. The display system 28 is secured to the head unit body 26.

The belt pack 20 has a processor and a storage device connected to the processor. Vision algorithms are stored on the storage device and are executable by the processor. The belt pack 20 is communicatively connected to the display system 28 with a cable connection 30. The belt pack 20 further includes a network interface device that permits the belt pack 20 to connect wirelessly over a link 32 with the network 22. The server 24 is connected to the network 22.

In use, the user 10 secures the head unit body 26 to their head. The display system 28 includes an optical waveguide (not shown) that is transparent so that the user 10 can see the real-world object 14 through the waveguide.

The belt pack 20 may download image data from the server 24 over the network 22 and the link 32. The belt pack 20 provides the image data through the cable connection 30 to the display system 28. The display system 28 has one or more projectors that create light based on the image data. The light propagates through the one or more optical waveguides to eyes of the user 10. Each waveguide creates light at a particular focal length on a retina of a respective eye so that the eye sees the virtual object 16 at some distance behind the display system 28. The eye thus sees the virtual object 16 in three-dimensional space. Additionally, slightly different images are created for each eye so that a brain of the user 10 perceives the virtual object 16 in three-dimensional space. The user 10 thus sees the real-world object 14 augmented with the virtual object 16 in three-dimensional space.

The user interaction system 12 further includes a totem 34. In use, the user 10 holds the totem 34 in one of their hands. The virtual object 16 is positioned in three-dimensional space based on the positioning of the totem 34. By way of example, the totem 34 may be a handle of a racket and the virtual object 16 may include the head of the racket. The user 10 can move the totem 34 in six degrees of freedom in three-dimensional space. The totem 34 thus moves in three-dimensional space relative to the real-world object 14 and the head unit body 26. Various components within the head unit 18 and the belt pack 20 track movement of the totem 34 and move the virtual object 16 together with the totem 34. The head of the racket thus remains attached to the handle in the view of the user 10.

Figure 2:
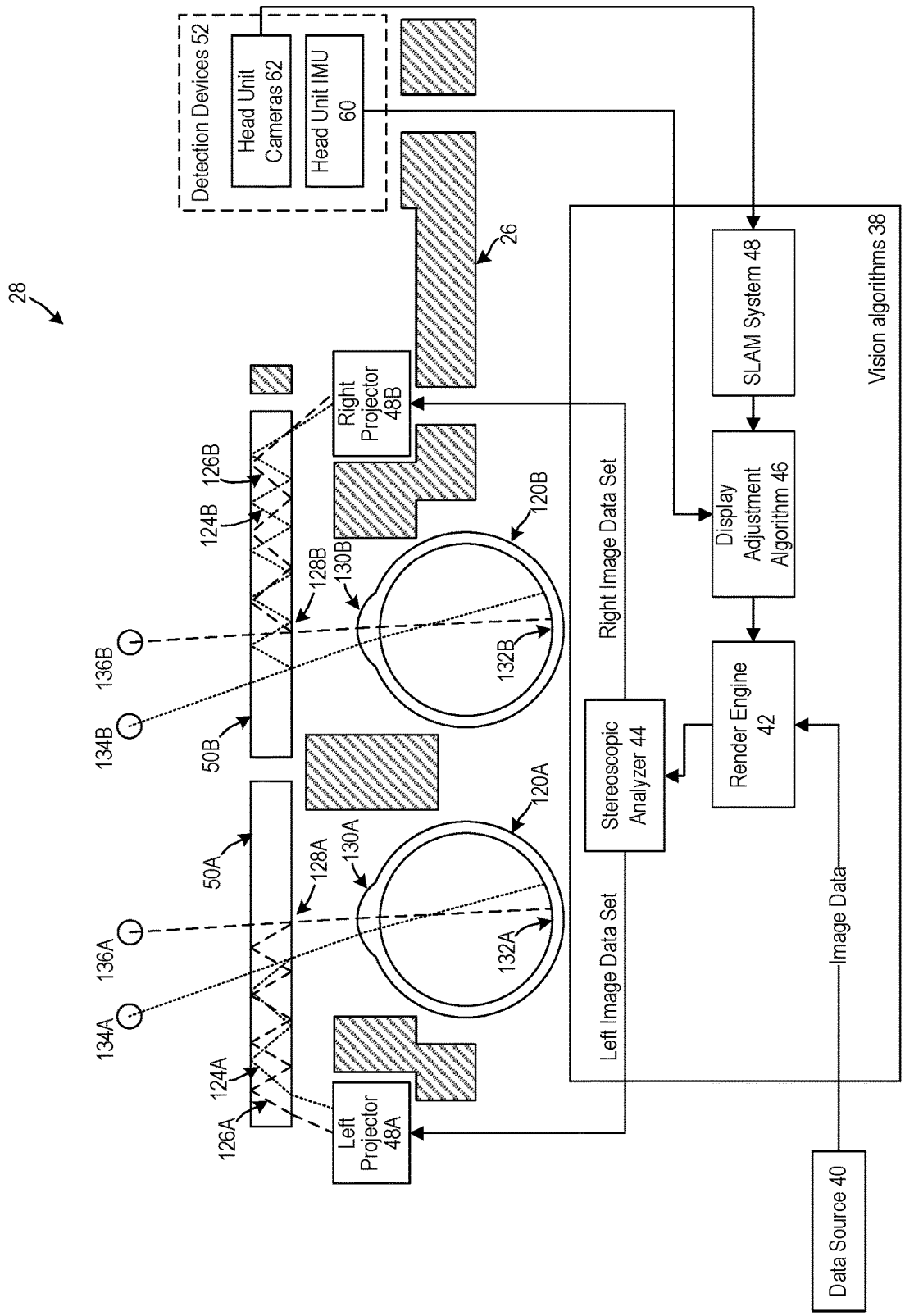
FIG. 2 is a block diagram illustrating components of the user interaction system as it relates to a head unit and vision algorithms for the head unit.

FIG. 2 illustrates the display system 28 in more detail together with vision algorithms 38. The vision algorithms 38 primarily reside within the belt pack 20 in FIG. 1. In other embodiments, the vision algorithms 38 may reside entirely within a head unit or may be split between a head unit and a belt pack. FIG. 2 further includes a data source 40. In the present example, the data source 40 includes image data that is stored on a storage device of the belt pack 20. The image data may, for example, be three-dimensional image data that can be used to render the virtual object 16. In alternate embodiments, the image data may be time sequenced image data that allows for the creation of a video that moves in two- or three-dimensions, and may have as its purpose attachment to a totem, be located on a real-world object, or be in a fixed position in front of a user when the user moves their head.

The vision algorithms 38 include a render engine 42, a stereoscopic analyzer 44, a display adjustment algorithm 46 and a simultaneous localization and mapping (SLAM) system 48.

The render engine 42 is connected to the data source 40 and the display adjustment algorithm 46. The render engine 42 is capable of receiving inputs from various systems, in the present example the display adjustment algorithm 46, and positions the image data within a frame that is to be viewed by the user 10 based on the display adjustment algorithm 46. The display adjustment algorithm 46 is connected to the SLAM system 48. The SLAM system 48 is capable of receiving image data, analyzing the image data for purposes of determining objects within images of the image data, and recording the locations of the objects within the image data.

The stereoscopic analyzer 44 is connected to the render engine 42. The stereoscopic analyzer 44 is capable of determining left and right image data sets from a data stream that is provided by the render engine 42.

The display system 28 includes left and right projectors 48A and 48B, left and right waveguides 50A and 50B, and detection devices 52. The left and right projectors 48A and 48B are connected to power supplies. Each projector 48A or 48B has a respective input for image data to be provided to the respective projector 48A or 48B. The respective projector 48A or 48B, when powered, generates light in a two-dimensional pattern and emanates the light therefrom. The left and right waveguides 50A and 50B are positioned to receive the light from the left and right projectors 48A and 48B, respectively. The left and right waveguides 50A and 50B are transparent waveguides.

The detection devices 52 include a head unit inertial motion unit (IMU) 60 and one or more head unit cameras 62. The head unit IMU 60 includes one or more gyroscopes and one or more accelerometers. The gyroscopes and accelerometers are typically formed in a semiconductor chip and are capable of detecting movement of the head unit IMU 60 and the head unit body 26, including movement along three orthogonal axes and rotation about three orthogonal axes.

The head unit cameras 62 continually capture images from an environment around the head unit body 26. The images can be compared to one another to detect movement of the head unit body 26 and the head of the user 10.

The SLAM system 48 is connected to the head unit cameras 62. The display adjustment algorithm 46 is connected to the head unit IMU 60. One of ordinary skill in the art will appreciate that the connections between the detection devices 52 and the vision algorithms 38 are accomplished through a combination of hardware, firmware and software. The components of the vision algorithms 38 are linked to one another through subroutines or calls.

In use, the user 10 mounts the head unit body 26 to their head. Components of the head unit body 26 may, for example, include a strap (not shown) that wraps around the back of a head of the user 10. The left and right waveguides 50A and 50B are then located in front of left and right eyes 120A and 120B of the user 10.

The render engine 42 receives image data from the data source 40. The render engine 42 enters the image data into the stereoscopic analyzer 44. The image data is three-dimensional image data of the virtual object 16 in FIG. 1. The stereoscopic analyzer 44 analyzes the image data to determine left and right image data sets based on the image data. The left and right image data sets are data sets that represent two-dimensional images that differ slightly from one another for purposes of giving the user 10 a perception of a three-dimensional rendering. In the present embodiment, the image data is a static data set that does not change over time.

The stereoscopic analyzer 44 enters the left and right image data sets into the left and right projectors 48A and 48B. The left and right projectors 48A and 48B then create left and right light patterns. The components of the display system 28 are shown in plan view, although it should be understood that the left and right patters are two-dimensional patterns when shown in front elevation view. Each light pattern includes a plurality of pixels. For purposes of illustration, light rays 124A and 126A from two of the pixels are shown leaving the left projector 48A and entering the left waveguide 50A. The light rays 124A and 126A reflect from sides of the left waveguide 50A. It is shown that the light rays 124A and 126A propagate through internal reflection from left to right within the left waveguide 50A, although it should be understood that the light rays 124A and 126A also propagate in a direction into the paper using refractory and reflective systems.

The light rays 124A and 126A exit the left light waveguide 50A through a pupil 128A and then enter a left eye 120A through a pupil 130A of the left eye 120A. The light rays 124A and 126A then fall on a retina 132A of the left eye 120A. In this manner, the left light pattern falls on the retina 132A of the left eye 120A. The user 10 is given the perception that the pixels that are formed on the retina 132A are pixels 134A and 136A that the user 10 perceives to be at some distance on a side of the left waveguide 50A opposing the left eye 120A. Depth perception is created by manipulating the focal length of the light.

In a similar manner, the stereoscopic analyzer 44 enters the right image data set into the right projector 48B. The right projector 48B transmits the right light pattern, which is represented by pixels in the form of light rays 124B and 126B. The light rays 124B and 126B reflect within the right waveguide 50B and exit through a pupil 128B. The light rays 124B and 126B then enter through a pupil 130B of the right eye 120B and fall on a retina 132B of a right eye 120B. The pixels of the light rays 124B and 126B are perceived as pixels 134B and 136B behind the right waveguide 50B.

The patterns that are created on the retinas 132A and 132B are individually perceived as left and right images. The left and right images differ slightly from one another due to the functioning of the stereoscopic analyzer 44. The left and right images are perceived in a mind of the user 10 as a three-dimensional rendering.

As mentioned, the left and right waveguides 50A and 50B are transparent. Light from a real-life object on a side of the left and right waveguides 50A and 50B opposing the eyes 120A and 120B can project through the left and right waveguides 50A and 50B and fall on the retinas 132A and 132B. In particular, light from the real-world object 14 in FIG. 1 falls on the retinas 132A and 132B so that the user 10 can see the real-world object 14. Additionally, the user 10 can see the totem 34 and augmented reality is created wherein the real-world object 14 and the totem 34 are augmented with a three-dimensional rendering of the virtual object 16 that is perceived by the user 10 due to the left and right images that are, in combination, perceived by the user 10.

The head unit IMU 60 detects every movement of the head of the user 10. Should the user 10, for example, move their head counterclockwise and simultaneously move their body together with their head towards the right, such movement will be detected by the gyroscopes and accelerometers in the head unit IMU 60. The head unit IMU 60 provides the measurements from the gyroscopes and the accelerometers to the display adjustment algorithm 46. The display adjustment algorithm 46 calculates a placement value and provides the placement value to the render engine 42. The render engine 42 modifies the image data received from the data source 40 to compensate for the movement of the head of the user 10. The render engine 42 provides the modified image data to the stereoscopic analyzer 44 for display to the user 10.

The head unit cameras 62 continually capture images as the user 10 moves their head. The SLAM system 48 analyzes the images and identifies images of objects within the image. The SLAM system 48 analyzes movement of the objects to determine a pose position of the head unit body 26. The SLAM system 48 provides the pose position to the display adjustment algorithm 46. The display adjustment algorithm 46 uses the pose position to further refine the placement value that the display adjustment algorithm 46 provides to the render engine 42. The render engine 42 thus modifies the image data received from the data source 40 based on a combination of the motion sensors in the head unit IMU 60 and images taken by the head unit cameras 62. By way of a practical example, if the user 10 rotates their head to the right, a location of the virtual object 16 rotates to the left within the view of the user 10 thus giving the user 10 the impression that the location of the virtual object 16 remains stationary relative to the real-world object 14 and the totem 34.

Figure 3:
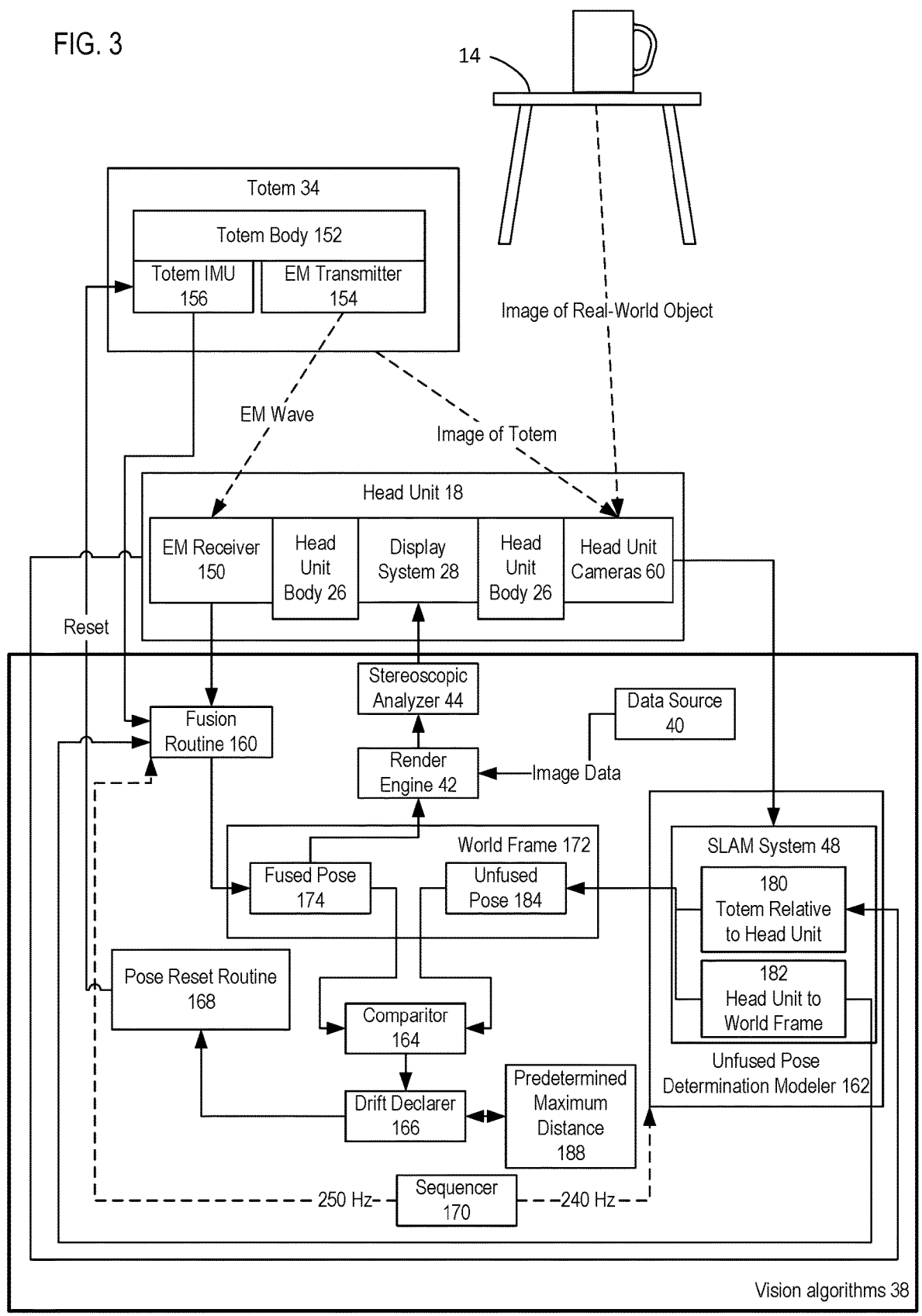
FIG. 3 is block diagram of the user interaction system as it relates to a totem and vision algorithms for the totem.

FIG. 3 illustrates further details of the head unit 18, the totem 34 and the vision algorithms 38. The head unit 18 further includes an electromagnetic (EM) receiver 150 secured to the head unit body 26. The display system 28, head unit cameras 62 and EM receiver 150 are mounted in fixed positions relative to the head unit body 26. If the user 10 moves their head, the head unit body 26 moves together with the head of the user 10 and the display system 28, head unit cameras 62 and EM receiver 150 move together with the head unit body 26.

The totem 34 has a totem body 152, an EM transmitter 154 and a totem IMU 156. The EM transmitter 154 and the totem IMU 156 are mounted in fixed positions relative to the totem body 152. The user 10 holds on to the totem body 152 and when the user 10 moves the totem body 152, the EM transmitter 154 and the totem IMU 156 move together with the totem body 152. The EM transmitter 154 is capable of transmitting an EM wave and the EM receiver 150 is capable of receiving the EM wave. The totem IMU 156 has one or more gyroscopes and one or more accelerometers. The gyroscopes and accelerometers are typically formed in a semiconductor chip and are capable of detecting movement of the totem IMU 156 and the totem body 152, including movement along three orthogonal axes and rotation about three orthogonal axes.

The vision algorithms 38, in addition to the data source 40, render engine 42, stereoscopic analyzer 44 and SLAM system 48 described with reference to FIG. 2 further include a fusion routine 160, an unfused pose determination modeler 162, a comparator 164, a drift declarer 166, a pose correction routine 168, and a sequencer 170.

The head unit cameras 62 capture images of the real-world object 14. The images of the real-world object 14 are processed by the SLAM system 48 to establish a world frame 172 as described with reference to FIG. 2. Details of how the SLAM system 48 establishes the world frame 172 are not shown in FIG. 3 so as not obscure the drawing.

The EM transmitter 154 transmits an EM wave that is received by the EM receiver 150. The EM wave that is received by the EM receiver 150 indicates a pose or a change of a pose of the EM transmitter 154. The EM receiver 150 enters data of the EM wave into the fusion routine 160.

The totem IMU 156 continually monitors movement of the totem body 152. Data from the totem IMU 156 is entered into the fusion routine 160.

The sequencer 170 executes the fusion routine 160 at a frequency of 250 Hz. The fusion routine 160 combines the data from the EM receiver 150 with the data from the totem IMU 156 and from the SLAM system 48. The EM wave that is received by the EM receiver 150 includes data that represents relatively accurately the pose of the EM transmitter 154 relative to the EM receiver 150 in six degrees of freedom ("6dof"). However, due to EM measurement noise, the measured EM wave may not accurately represent the pose of the EM transmitter 154 relative to the EM receiver 150. The EM measurement noise may result in jitter of the virtual object 16 in FIG. 1. The purpose of combining the data from the totem IMU 156 is to reduce jitter. The fusion routine 160 provides a fused pose 174 within the world frame 172. The fused pose 174 is used by the render engine 42 for purposes of determining the pose of the virtual object 16 in FIG. 1 using the image data from the data source 40.

Figure 4:
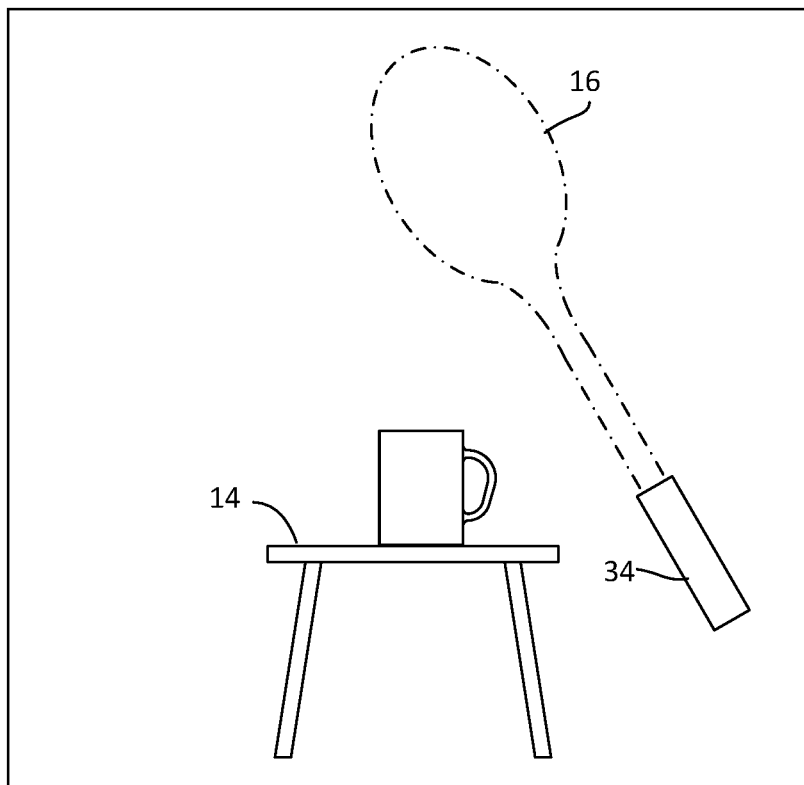
FIG. 4 is a front view illustrating how the user sees and perceives real and virtual objects.

As shown in FIG. 4, the virtual object 16 is shown in a correct pose relative to the totem 34. Furthermore, if the user 10 moves the totem 34, the virtual object 16 moves together with the totem 34 with a minimal amount of jitter.

The totem IMU 156 essentially measures acceleration and angular rate in six degrees of freedom. The acceleration and angular rate are integrated to determine a location and orientation of the totem IMU 156. Due to integration errors, the fused pose 174 may drift over time.

Figure 5:
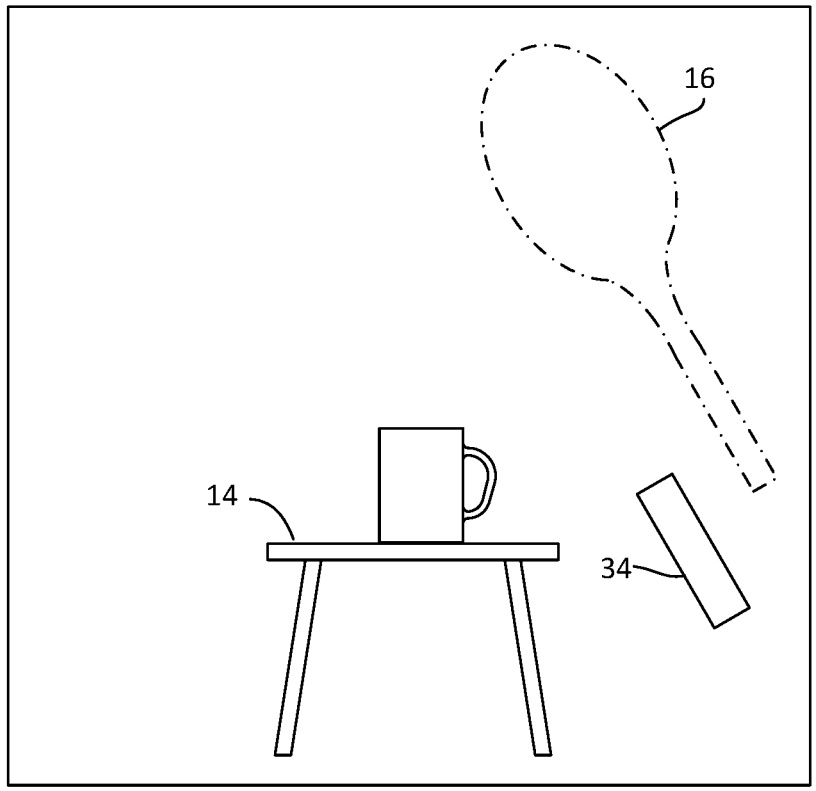
FIG. 5 is a view similar to FIG. 4 after a virtual object has drifted within the view of the user.

FIG. 5 illustrates that the virtual object 16 has drifted from its correct pose relative to the totem 34. The drift could be caused by the so-called "model mismatch", i.e., the imperfect mathematical models that describe the relationship between the physical quantities (e.g., 6dof, acceleration, and angular rate) and the actually measured signal (such as the EM wave measurement, and the IMU signals). And such drift could be amplified for high dynamic motion that can even lead to the fusion algorithm to diverge (i.e., the virtual object would like to be "blown away" from the actual object). In the present example, the virtual object 16 has drifted to the right relative to the totem 34. The fused pose 174 in FIG. 3 is based on the belief by the system that the totem 34 is located further to the right than where it actually is located. The fused data thus has to be corrected so that virtual object 16 is again placed in its correct location relative to the totem 34 as shown in FIG. 4.

In FIG. 3, the sequencer 170 executes the unfused pose determination modeler 162 at a frequency of 240 Hz. The unfused pose determination modeler 162 thus executes asynchronously relative to the fusion routine 160. In the present example, the unfused pose determination modeler 162 makes use of the SLAM system 48 to determine the location of the totem 34. Other systems my use other techniques to determine the location of the totem 34.

The head unit cameras 62 routinely capture images of the totem 34 together with the images of the real-world objects such as the real-world object 14. The images that are captured by the head unit cameras 62 are entered in to the SLAM system 48. The SLAM system 48, in addition to determining the locations of the real-world objects such as the real-world object 14, also determines the location of the totem 34. As such, the SLAM system 48 establishes a relationship 180 of the totem 34 relative to the head unit 18. The SLAM system 48 also relies on data from the EM receiver 150 for establishing the relationship 180.

The SLAM system 48 also establishes a relationship 182 of the head unit relative to the world frame 172. As mentioned earlier, the fusion routine 60 receives an input from the SLAM system 48. The fusion routine used the relationship 182 of the head unit to the world frame, i.e. the head pose, as part of the calculations of the fused model of the pose of the totem 34.

The relative pose of the totem 34 to the head unit 18 is established by solving the EM dipole model from the measurement by the EM Receiver 150. The two relationships 180 and 182 thus establish a pose of the totem 34 within the world frame 172. The relationship of the totem 34 and the world frame 172 is stored as an unfused pose 184 within the world frame 172.

The comparator 164 executes synchronously together with the unfused pose determination modeler 162. The comparator 164 compares the fused pose 174 with the unfused location 184. The comparator 164 then enters a difference between the fused pose 174 and the unfused pose 184 into the drift declarer 166. The drift declarer 166 declares a drift only if the difference between the fused pose 174 and unfused pose 184 is more than a predetermined maximum distance 188 that is stored within the vision algorithms 38. The predetermined maximum distance 188 is typically less than 100 mm, and is preferably on the order of 30 mm, 20 mm or more preferably 10 mm and are determined or tuned through data analysis of the sensor fusion system. The drift declarer 166 does not declare a drift if the difference between the fused pose 174 and unfused pose 184 is less than the predetermined maximum distance 188.

When the drift declarer 166 declares a drift, the drift declarer 166 enters the pose reset routine 168. The pose reset routine 168 uses the unfused pose 184 to reset the fused pose 174 in the fusion routine 160, so the drifting is stopped and fusion routine 160 re-starts a pose tracking with the drifting being eliminated.

Figure 6:
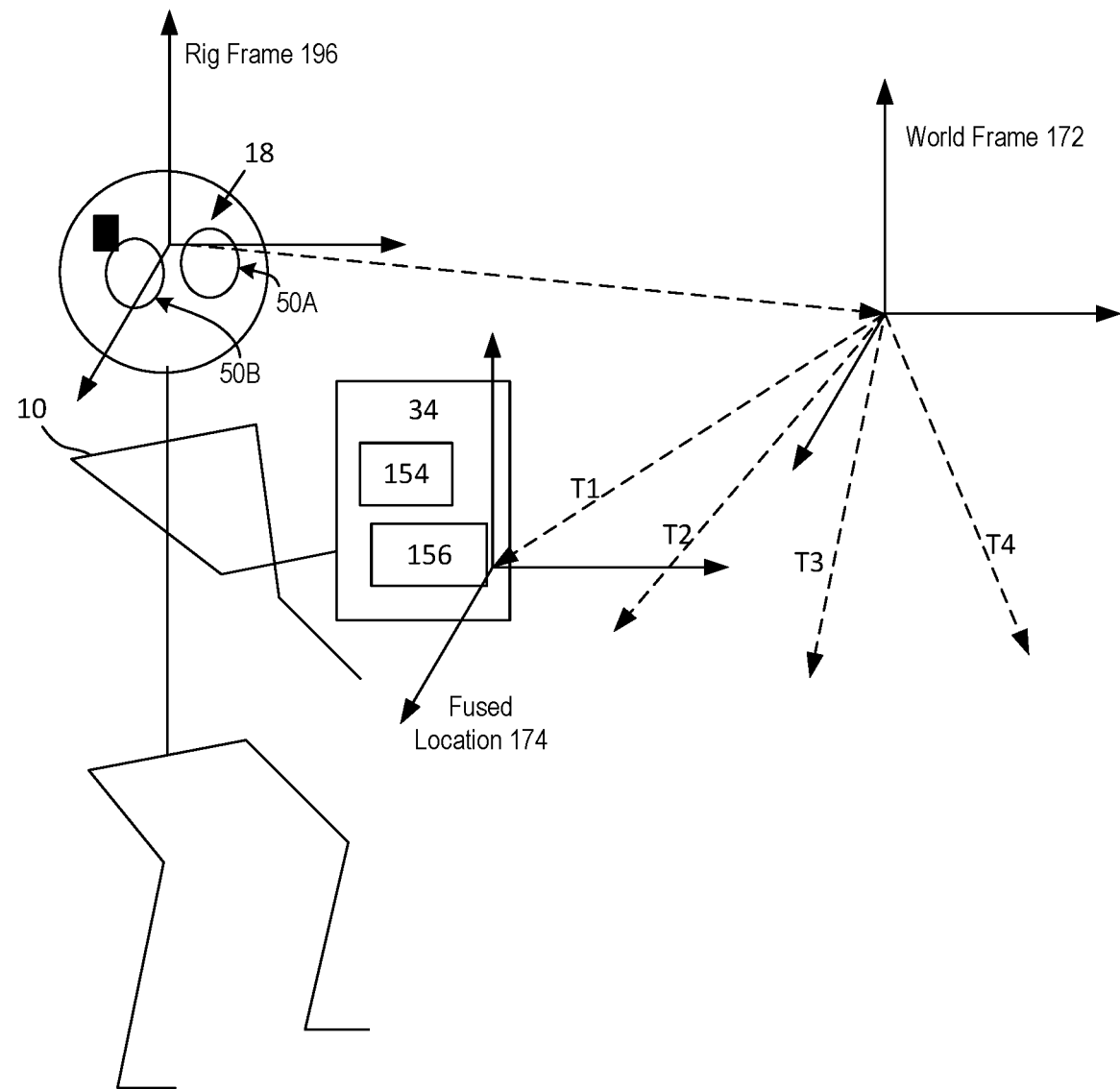
FIG. 6 is a perspective view illustrating drift of a fused location over time.

FIG. 6 illustrates a relationship between a rig frame 196, the world frame 172 and the fused pose 174. The rig frame 196 is a mathematical object that represents a head frame of the head unit 18. The rig frame 196 is located between the waveguides 50A and 50B. In a high-dynamic motion scenario, the fused pose 174 may drift over time (T1; T2; T3; T4) due to imperfect modeling of the actual EM Receiver measurement. The fused pose 174 initially represents the actual pose of the totem 34, but in such a high-dynamic motion scenario it may progressively fail to represent the actual pose of the totem 34 as it drifts further from the actual pose of the totem 34 over time.

Figure 7:
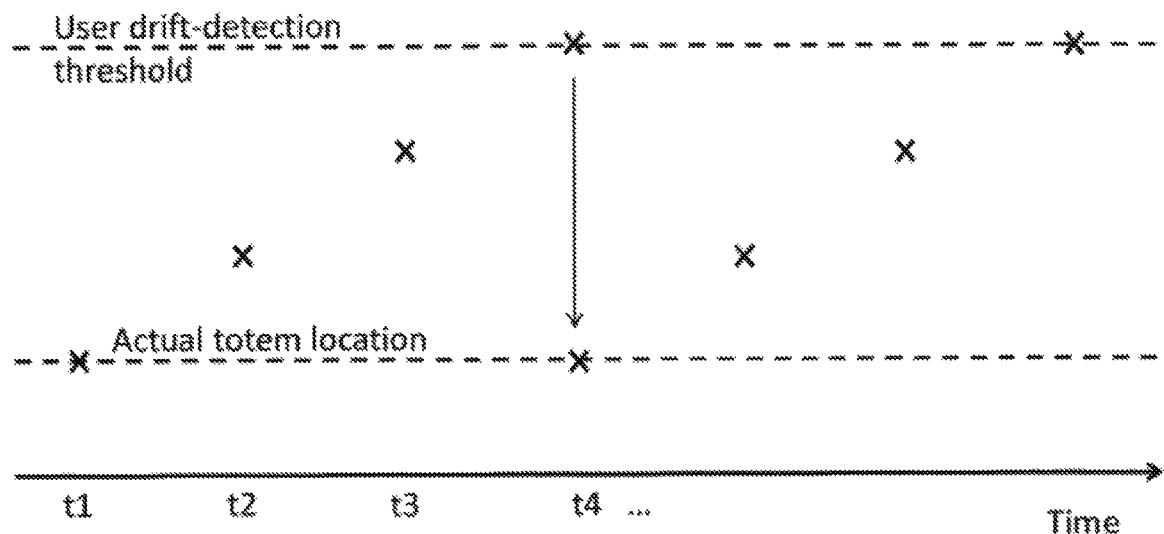
FIG. 7 is a graph illustrating how drift can be corrected using a distance calculation.

FIG. 7 illustrates one method of correcting for the drift. The method illustrated in FIG. 7 has a user drift-detection threshold that is distance-based. By way of example, if the totem 34 is more than 2 meters from the head unit 18, it is not possible for the user 10 to hold on to the totem 34 at such a distance and a drift is declared. If the user 10 can, for example, extend their arm by 0.5 meters, then the system will only declare a drift when the drift has reached an additional 1.5 meters. Such a large drift is undesirable. A system where drift is declared more quickly is more desirable.

Figure 8:
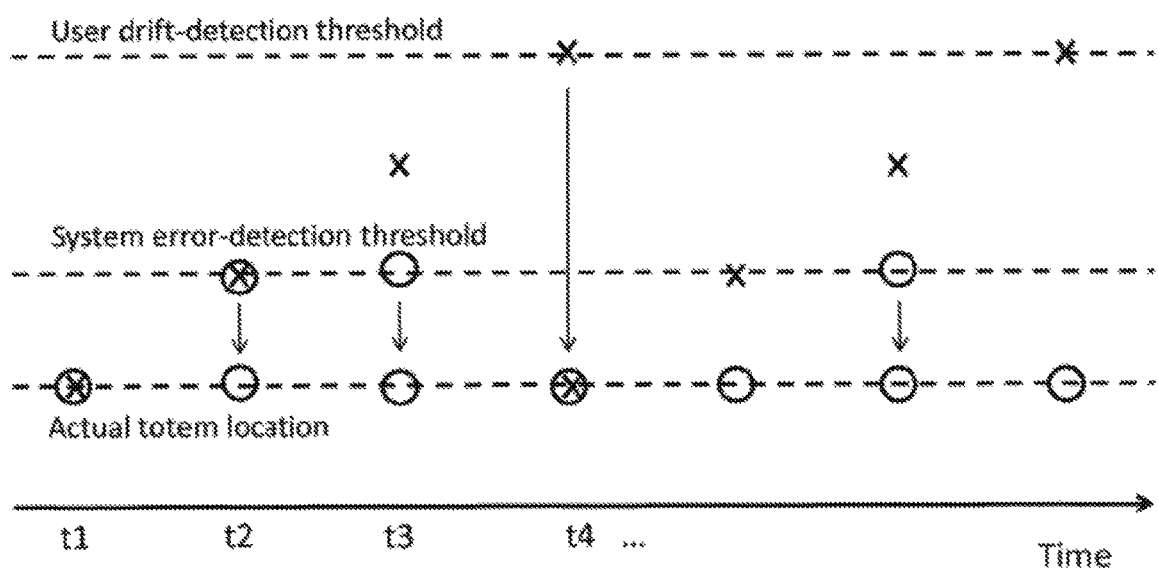
FIG. 8 is a graph illustrating how drift is corrected by detecting a difference between the fused location and an unfused location.

FIG. 8 illustrates the manner that the drift is declared according to the embodiment in FIG. 3. As noted with reference to FIG. 3, the unfused pose determination modeler 162 calculates the unfused pose 184 at a frequency of 240 Hz. As noted above, a drift may be declared if a difference between the fused pose 174 and the unfused location 184 is 100 mm or less as described above. At t1, the system-error detection threshold of, for example 100 mm, is reached and a drift is declared. At t2, the drift is immediately corrected. The drift can thus be corrected for smaller distance errors in the system in FIG. 8 than in the system of FIG. 7. Additionally, the drift may again be corrected at t3. Drift can thus be corrected more frequently in the system of FIG. 8 than in the system of FIG. 7.

Figure 9:
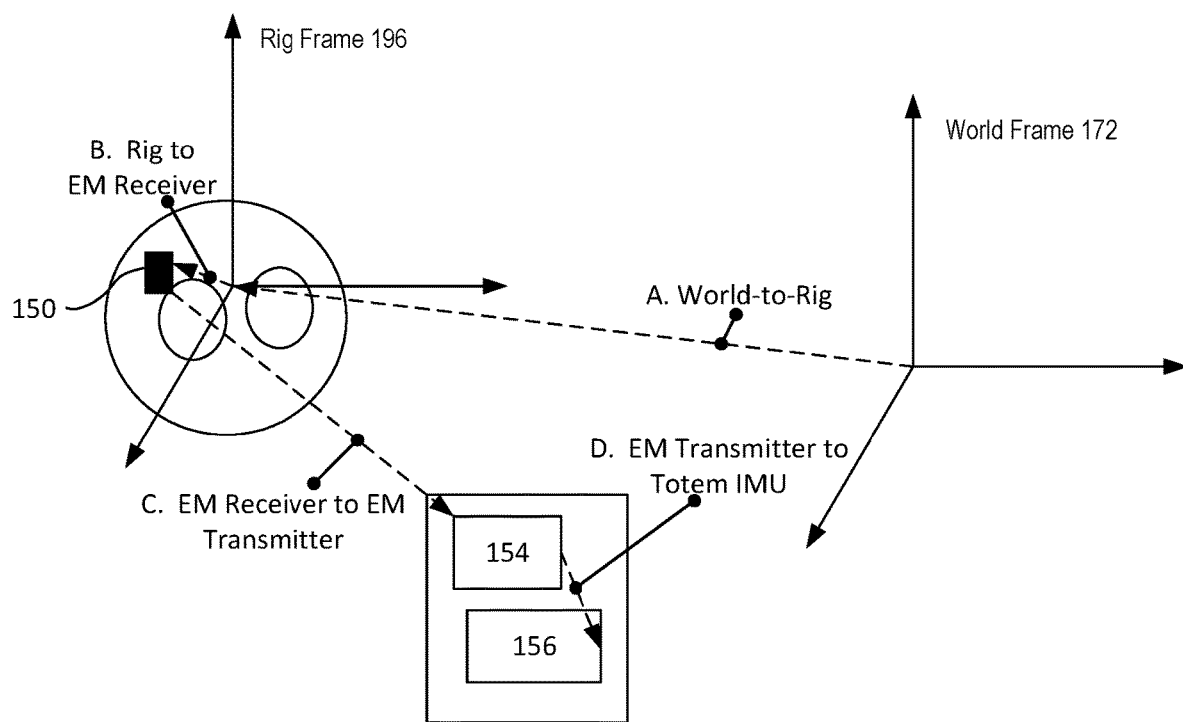
FIG. 9 is a perspective view illustrating how drift is corrected.

FIG. 9 shows how the drift is corrected. At A, a relationship is established between the world frame 172 and the rig frame 196. The rig frame 196 is not located in the same position as the EM receiver 150. Due to factory calibration, the location of the EM receiver 150 relative to the rig frame 196 is known. At B, an adjustment is made to calculate the rig frame 196 relative to the location of the EM receiver 150. At C, an estimation is made of the location of the EM receiver 150 relative to the EM transmitter 154. As noted above, such an estimation may be made using the SLAM system 48. Due to factory calibration, the location of the EM transmitter 154 is known relative to the location of the totem IMU 156. At D, an adjustment is made to determine the location of the totem IMU 156 relative to the EM transmitter 154. The calculations made at A, B, C and D thus establish the location of the totem IMU 156 in the world frame 172. The pose of the totem IMU 156 can then be reset based on the location of the totem IMU 156 in the world frame 172 as calculated.

Figure 10:
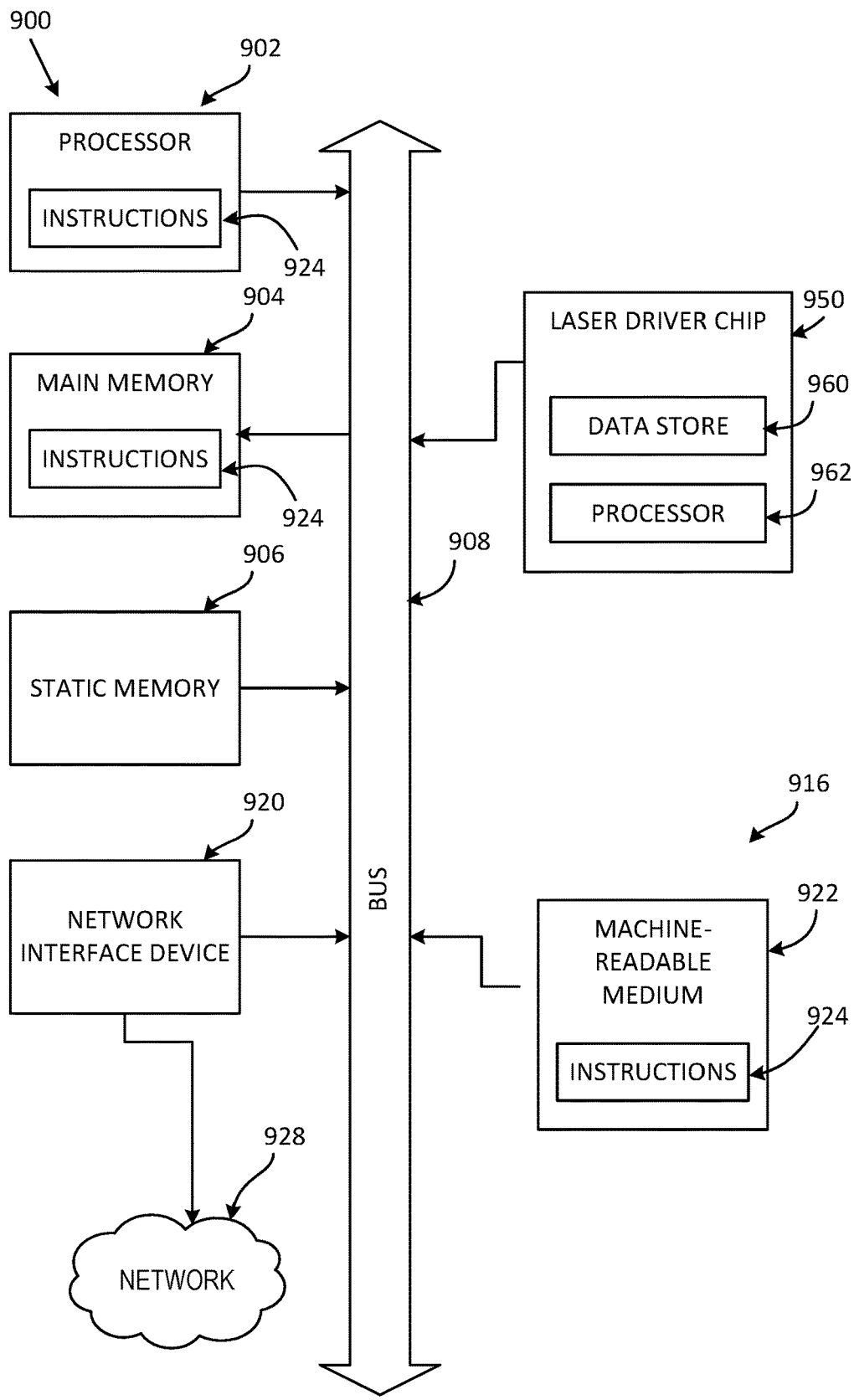
FIG. 10 is a block diagram of a machine in the form of a computer that can find application in the present invention system, in accordance with one embodiment of the invention.

FIG. 10 shows a diagrammatic representation of a machine in the exemplary form of a computer system 900 within which a set of instructions, for causing the machine to perform any one or more of the methodologies discussed herein, may be executed, according to some embodiments. In alternative embodiments, the machine operates as a standalone device or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a disk drive unit 916, and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

The computer system 900 includes a laser driver chip 950 that is used to drive projectors to generate laser light. The laser driver chip 950 includes its own data store 960 and its own processor 962.

While the machine-readable medium 922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A user interaction system comprising:
   a totem having:
     a totem body
     an electromagnetic (EM) transmitter on the totem body; and
     a totem inertial measurement unit (IMU) located on the totem, to generate a totem IMU signal due to movement of the totem;
   a head unit having:
     a head unit body; and
     an EM receiver on the head unit body to receive an EM wave transmitted by the EM transmitter, the EM wave being indicative of a location of the totem;
   a processor;
   a storage device connected to the processor;
   a set of instructions on the storage device and executable by the processor, including:
     a world frame;
     a fusion routine connected to the EM receiver and the totem IMU to generate a fused pose of the totem in the world frame based on a combination of the EM wave, the head unit pose, and the totem IMU data;
     an unfused pose determination modeler that determines a pose of the totem relative to the head unit and a pose of the head unit relative to the world frame to establish an unfused pose of the totem relative to the world frame;
     a comparator connected to the fused pose and the unfused pose to compare the fused pose with the unfused pose;
     a drift declarer connected to the comparator to declare a drift only if the fused pose is more than a predetermined distance from the unfused pose;
     a location correction routine connected to the drift declarer to reset a pose of the totem IMU to match the unfused location only if the drift is declared;

a data source to carry image data; and
a display system connected to the data source to display a virtual object using the image data to a user, a location of the virtual object being based on the fused location of the totem.

2. The user interaction system of claim 1, further comprising:
a render engine having an input connected to the data channel to receive the image data and an output to the display system, the render engine providing a data stream to the display system that includes the virtual object positioned at the fused pose.

3. The user interaction system of claim 1, wherein the totem IMU reduces jitter of the virtual object.

4. The user interaction system of claim 1, wherein the totem IMU includes at least one of a gyroscope and an accelerometer.

5. The user interaction system of claim 1, wherein the fusion routine executes at a first frequency and the unfused pose determination modeler executes at a second frequency that is different from the first frequency.

6. The user interaction system of claim 1, wherein the EM receiver detects six-degrees of freedom ("6dof") movement of the EM transmitter relative to the EM receiver.

7. The user interaction system of claim 1, wherein the predetermined distance is less than 100 mm.

8. The user interaction system of claim 1, further comprising:
a camera on the head unit body, the camera positioned to capture an image of the totem; and
a simultaneous localization and mapping (SLAM) system connected to the camera to receive the image of the totem, the SLAM system determining the unfused pose based on the image of the totem.

9. The user interaction system of claim 1, wherein the display system includes:
a transparent waveguide secured to the head unit body that permits light from the totem through to an eye of a user wearing the head unit body; and
a projector that converts that image data to light, the light from the projector entering into the waveguide at an entry pupil and leaving the waveguide at an exit pupil to the eye of the user.

10. The user interaction system of claim 1, further comprising:
a head unit detection device that detects movement of the head-mountable frame, the set of instructions including:
a display adjustment algorithm that is connected to the head unit detection device and receives a measurement based on movement detected by the head unit detection device and calculates placement value; and
a render engine that modifies a position of the virtual object within a view of the eye based on the placement value.

11. The user interaction system of claim 10, wherein the head unit detection device includes:
a head unit IMU mounted to the head-mountable frame, the head unit IMU including a motion sensor that detects movement of the head-mountable frame, wherein the head unit IMU includes at least one of a gyroscope and an accelerometer.

12. The user interaction system of claim 10, wherein the head unit detection device includes:
a head unit camera mounted to the head-mountable frame, the head unit camera detecting movement of the head-mountable frame by taking images of objects within view of the head unit camera, the set of instructions including:
a simultaneous localization and mapping (SLAM) system connected to the camera to receive the images of the objects to detect a pose position of the head unit body, the render engine modifying the position of the virtual object based on the pose position.

13. The user interaction system of claim 1, wherein the location correction routine is executable to carry out a method that includes:
storing a rig frame, being a mathematical object located between eyepieces of the head unit to serve as the basis for defining where an object lies relative to the head unit;
taking a measurement to determine a rig frame pose, being the rig frame relative to the world frame;
deriving a receiver-to world pose using known extrinsics as provided by factory-level calibration for the relationship between the EM receiver and the rig frame;
estimating an EM relationship between the EM receiver and EM transmitter to derive a transmitter-in-world pose; and
deriving a totem IMU-in-world pose as an unfused pose using known extrinsics of the totem for the relationship between the EM transmitter and the totem IMU.

14. A user interaction method comprising:
transmitting an electromagnetic (EM) wave with an EM transmitter on a totem body;
generating a totem inertial measurement unit (IMU) signal with a totem IMU on the totem body due to movement of the totem;
locating a head unit body on a head of a user;
receiving the EM wave transmitted by the EM transmitter by an EM receiver on the head unit body, the EM wave being indicative of a pose of the totem;
storing a world frame;
executing, with a processor, a fusion routine to generate a fused pose of the totem in the world frame based on a combination of the EM wave, head unit pose, and the totem IMU data;
executing, with the processor, an unfused pose determination modeler that determines a pose of the totem relative to the head unit and a location of the head unit relative to the world frame to establish an unfused pose of the totem relative to the world frame;
executing, with the processor, a comparator to compare the fused pose with the unfused pose;
executing, with the processor, a drift declarer to declare a drift only if the fused pose is more than a predetermined pose from the unfused pose;
executing, with the processor, a pose correction routine to reset pose of the totem IMU to match the unfused pose only if the drift is declared;
receiving image data from a data source; and
displaying, with a display system connected to the data source, a virtual object using the image data to a user, a location of the virtual object being based on the fused pose of the totem.

* * * * *